(No Model.)

H. SPLITDORF.
INSULATED WIRE.

No. 383,919. Patented June 5, 1888.

WITNESSES:
Gustave Dieterich
T. F. Bourne.

INVENTOR,
Henry Splitdorf.
BY Briesen & Steele
ATTORNEYS.

United States Patent Office.

HENRY SPLITDORF, OF NEW YORK, N. Y., ASSIGNOR TO THE SPLITDORF WIRE COMPANY, OF SAME PLACE.

INSULATED WIRE.

SPECIFICATION forming part of Letters Patent No. 383,919, dated June 5, 1888.

Application filed November 12, 1887. Serial No. 255,018. (No model.)

*To all whom it may concern:*

Be it known that I, HENRY SPLITDORF, residing in the city, county, and State of New York, have invented an Improved Insulated Wire, of which the following is a specification, reference being had to the accompanying drawings, forming part of this specification, in which—

Figure 1:
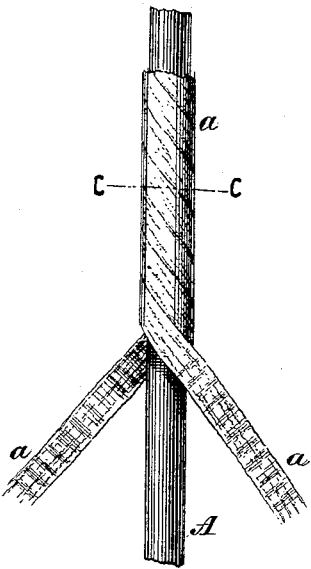
Figure 2:

Figure 1 represents a side view of a portion of an insulated wire embodying my improvements, and Fig. 2 is a cross section thereof.

The object of my invention is to provide a wire for electrical and other purposes with a non-combustible insulation.

In carrying out my invention I wind asbestus fibers $a$ around the wire A to be insulated. The asbestus fibers have first been made into a cord or thread. These fibers are very short and great care must be taken that they be not separated. In applying this asbestus to the wire I untwist the fibers when in the thread form and spread and flatten them into a thin layer when winding on the wire, as shown in Fig. 1. By applying the fibers in a thin spread-out layer, as described, the insulated wire will be of much smaller diameter than if wound with the asbestus fibers in the ordinary thread form, and therefore will not take up as much space when wound on cores, &c., as said thread-covered wires do.

I do not confine myself to applying the asbestus fibers when in the thread form, as the fibers may be applied in a thin-spread layer when in other forms. I prefer to apply the asbestus fibers by means of the machine patented by me and described in Letters Patent No. 300,403, June 17, 1884, and also by the machine for which I have made application for Letters Patent, Serial No. 256,972, filed December 5, 1887. By these machines the thread of asbestus fibers is untwisted and the fibers spread out in a thin layer, which lies closely around the wire.

In Fig. 1 of the drawings I have shown the fibers $a$ of asbestus as being in two separate thin-spread and flattened threads; but one or more than two such untwisted spread and flattened threads may be wrapped around the wire, as preferred.

This asbestus-covered wire will be found of great use, especially in dynamo-machines and in other electrical apparatus. Often the wires in electrical apparatus are "burned out" and the instruments destroyed from various causes, but principally because when an increased current passes through the wire the insulation used heretofore was instantly consumed. When the insulation was thus burned off, the wire would be left exposed, and therefore useless. With this asbestus-covered wire, if a current of increased strength passes through the wire, the insulation-wire will remain unaffected, because the asbestus covering cannot be burned off. If desired, the wire may be coated with gum before the asbestus is applied, and then the whole heated to cause the fibers to adhere more firmly to the wire, as described in Letters Patent No. 171,185, December 14, 1875, or as shown in Letters Patent No. 239,070, March 22, 1881, both of which were granted to me.

This asbestus insulation will not crack when the wire is bent.

By wire I mean plain wire or any other metallic conductor.

Having now described my invention, what I claim is—

A wire for electrical and other purposes covered with asbestus fibers applied in the form of an untwisted spread and flattened thread, substantially as herein shown and described.

HENRY SPLITDORF.

Witnesses:
   C. C. SIBLEY,
   HARRY M. TURK.